United States Patent
Yasuda et al.

(10) Patent No.: US 9,791,003 B2
(45) Date of Patent: Oct. 17, 2017

(54) ELECTROMAGNETIC BRAKE WHICH HAS SHAFT DROP PREVENTION FUNCTION, ELECTRIC MOTOR, AND MACHINE

(71) Applicant: FANUC CORPORATION, Yamanashi (JP)

(72) Inventors: Ryuya Yasuda, Yamanashi (JP); Hiroshi Kougami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/173,080

(22) Filed: Feb. 5, 2014

(65) Prior Publication Data
US 2014/0216867 A1    Aug. 7, 2014

(30) Foreign Application Priority Data
Feb. 7, 2013    (JP) .................. 2013-022597

(51) Int. Cl.
F16D 63/00 (2006.01)
F16D 55/28 (2006.01)
F16D 65/02 (2006.01)
F16D 121/22 (2012.01)

(52) U.S. Cl.
CPC .......... F16D 63/002 (2013.01); F16D 55/28 (2013.01); F16D 2065/1368 (2013.01); F16D 2065/1396 (2013.01); F16D 2121/22 (2013.01)

(58) Field of Classification Search
CPC .. F16D 2121/22; F16D 63/002; F16D 65/123; F16D 2065/1348; F16D 2065/1364; F16D 2065/1368; F16D 2065/1396; F16D 55/28
See application file for complete search history.

(56) References Cited

U.S. PATENT DOCUMENTS

| | | | | |
|---|---|---|---|---|
| 2,438,381 | A | * | 3/1948 | Banker .................. F16D 41/04 |
| | | | | 192/48.6 |
| 4,445,596 | A | * | 5/1984 | Waters et al. ................ 188/171 |
| 2004/0154422 | A1 | | 8/2004 | Menjak et al. |
| 2009/0203453 | A1 | | 8/2009 | Heinrich |

FOREIGN PATENT DOCUMENTS

| | | |
|---|---|---|
| DE | 19855025 A1 | 6/2000 |
| DE | 102006019453 A1 | 10/2007 |
| JP | 61206136 | 12/1986 |
| JP | 61206136 U | 12/1986 |
| JP | 02280644 A | 11/1990 |
| JP | 2003222153 A | 8/2003 |
| JP | 2008195310 A | 8/2008 |

OTHER PUBLICATIONS

Partial Translation of Japanese Publication No. 61-206136, published Dec. 26, 1986, 1 page.
English Translation of German Publication No. 102006019453, published Oct. 25, 2007, 18 pages.
English Translation of German Publication No. 19855025, published Jun. 21, 2000, 11 pages.

* cited by examiner

*Primary Examiner* — Anna Momper
(74) *Attorney, Agent, or Firm* — Fredrikson & Byron, P.A.

(57) ABSTRACT

An electromagnetic brake (10) including a plurality of elastic members (25) which are arranged between an engagement surface of a brake pad (13) and an engagement surface of a hub (12) symmetrically about a center of rotation of the shaft (11). The biasing directions of the plurality of elastic members are in a rotational direction of the shaft.

4 Claims, 5 Drawing Sheets

ELECTROMAGNETIC BRAKE WHICH HAS SHAFT DROP PREVENTION FUNCTION, ELECTRIC MOTOR, AND MACHINE

BACKGROUND OF THE INVENTION

1. Field of the Invention

The present invention relates to an electromagnetic brake which constrains a shaft to prevent the shaft from dropping, an electric motor, and a machine.

2. Description of the Related Art

To drive moving parts of a machine, robot, etc., an electric motor with a brake is used. For example, such a brake is an electromagnetic brake which holds a rotational position of the electric motor when stopping rotation of the electric motor and the supply of power to the electric motor is stopped. In general, an electromagnetic brake includes a hub which is arranged fastened around a shaft, a brake pad which engages with the hub by spline engagement and rotates together with it, a fixed end plate which is arranged at one side of the brake pad, an armature which is arranged at the other side of the brake pad, and a coil spring which biases the armature to the end plate.

In such an electromagnetic brake, at the time of brake release, the brake pad has to be kept from being pushed against the armature and end plate. In other words, it is necessary to provide a clearance at the engagement part between the hub and brake pad and make the brake pad move in the axial direction at the time of brake release. However, when providing a clearance at the engagement part, at the time of brake operation, the shaft becomes offset by exactly the amount of the clearance of the engagement part and the shaft can drop by a slight distance.

Further, in Japanese Unexamined Utility Model Publication No. 61-206136U, an elastic member is arranged between the engagement surface of the hub and the engagement surface of the brake pad. In other words, the engagement surface of the hub and the engagement surface of the brake pad are pushed by the elastic member to eliminate the clearance of the engagement part. Due to this, noise of the two engagement surfaces striking each other at the time of rotation is prevented from occurring.

However, with just arranging an elastic member, sometimes the center axis of the hub and the center axis of the brake pad become offset from each other. For this reason, if a load acts on the shaft at the time of brake operation due to gravity, the center axis of the brake pad will move slightly trying to return to its original position. As a result, in the electromagnetic brake of the prior art, there is the problem that slight dropping of the shaft cannot be prevented.

The present invention was made in consideration of such a situation and has as its object the provision of an electromagnetic brake which prevents a shaft from dropping slightly even at the time of brake operation and of an electric motor and machine which have such an electromagnetic brake built into them.

SUMMARY OF INVENTION

To achieve the above-mentioned object, according to a first aspect, there is provided an electromagnetic brake comprising a hub which is arranged fastened around a shaft, a brake pad which engages with the hub by spline engagement and rotates together with it, a fixed end plate which is arranged at one side of the brake pad, an armature which is arranged at the other side of the brake pad, a biasing member which biases the armature to the end plate, and a field core which has an electromagnetic coil which magnetically attracts the armature against the biasing force of the biasing member, the electromagnetic brake further comprising a plurality of elastic members which are arranged between an engagement surface of the brake pad and an engagement surface of the hub symmetrically with respect to a center of rotation of the shaft and wherein biasing directions of the plurality of elastic members are made the same rotational direction.

According to a second aspect, there is provided an electric motor with an electromagnetic brake comprising a built-in electromagnetic brake of the first aspect.

According to a third aspect, there is provided a machine wherein a shaft is rotated by a dropping portion which drops due to gravity, wherein an electromagnetic brake of the first or second aspect is arranged at the shaft so that a direction of rotation of the shaft when gravity causes the dropping portion to drop and a direction in which the hub is biased by the elastic member match.

According to a fourth aspect, there is provided the first aspect wherein the elastic members are leaf springs.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
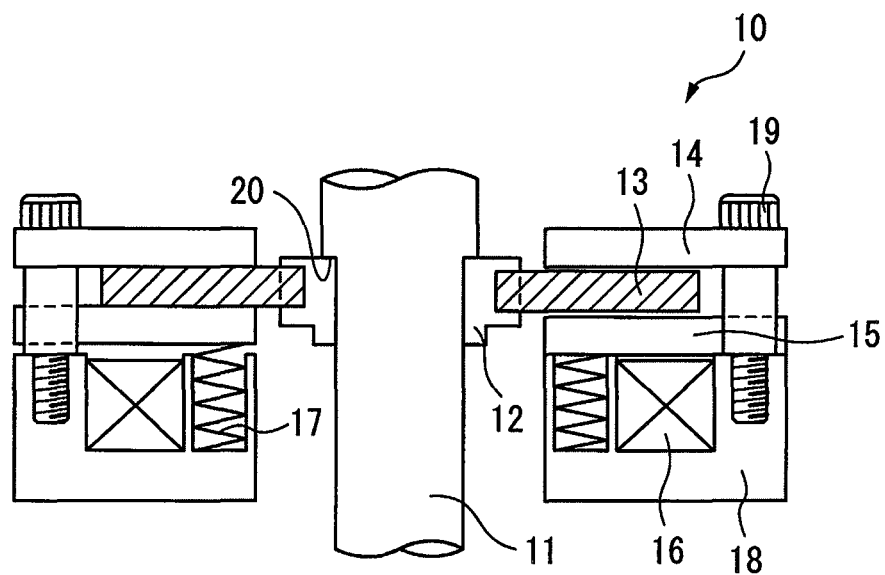
FIG. 1 is a cross-sectional view along the axial direction of an electromagnetic brake according to the present invention.

FIG. 1 is a cross-sectional view along the axial direction of an electromagnetic brake according to the present invention. As shown in FIG. 1, an electromagnetic brake 10 includes a shaft, for example, a shaft 11 of a not shown electric motor, around which is arranged fastened a hub 12. As illustrated, the circumferential surface of the shaft 11 is formed with a step part 20. One end of the hub 12 abuts against the step part 20. The hub 12 is engaged with a brake pad which engages with it by spline engagement and rotates together with it.

As shown in FIG. 1, at one side of the brake pad 13, an end plate 14 which is arranged separated from a field core 18 is fastened to the field core 18 by bolts 19. Further, the field core 18 further comprises an armature 15 which is arranged at the other side of the brake pad 13 and a biasing member 17, for example, a spring, which biases the armature 15 to the end plate. Furthermore, the field core 18 comprises an electromagnetic coil 16 which magnetically attracts the armature 15 against the biasing force of the biasing member 17.

Figure 2A:
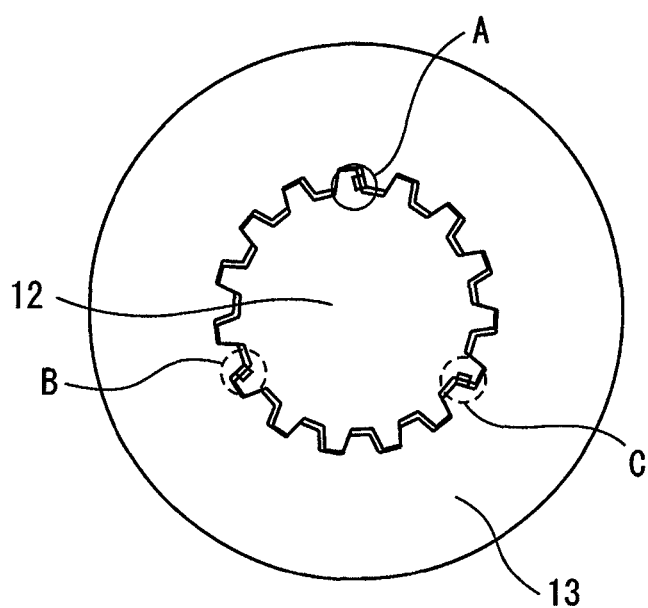
FIG. 2A is a top view of a hub and brake pad.

FIG. 2A is a top view of the hub and brake pad. To facilitate understanding, in FIG. 2A etc., illustration of the shaft 11 is omitted. As shown in FIG. 2A, the outer circumferential surface of the hub 12 is formed with a plurality of projecting parts, while the inner circumferential surface of the brake pad 13 is formed with a plurality of recessed parts. These hub 12 and brake pad 13 are determined in dimensions so as to engage with each other by spline engagement. Therefore, the brake pad 13 can move in the axial direction with respect to the hub 12.

Referring again to FIG. 1, when power to the electromagnetic brake 10 is cut off, the force of the biasing member 17 causes the armature 15 to be pushed against the brake pad 13. For this reason, the brake pad 13 is held between the armature 15 and the end plate 14, and the brake pad 13 can no longer move. Therefore, the electromagnetic brake 10 is locked in state.

Further, if the electromagnetic brake 10 is supplied with power, the electromagnetic coil 16 is driven and the armature 15 is attracted to the field core 18 against the biasing force of the biasing member 17. In other words, the armature 15 separates from the brake pad 13, so the brake pad 13 is released from the end plate 14 and the armature 15. In other words, the electromagnetic brake 10 is unlocked in state.

Figure 2B:
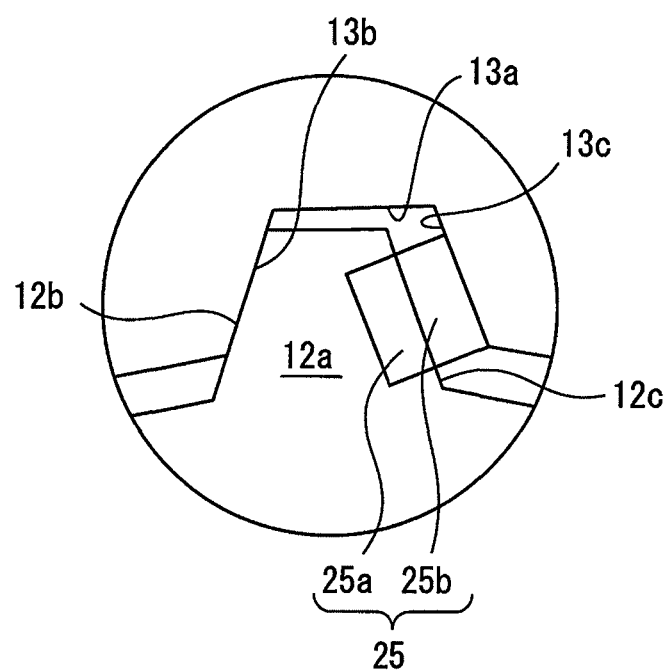
FIG. 2B is a partial enlarged view which shows enlarged a portion which is surrounded by a circle A of FIG. 2A.

In this regard, FIG. 2B is a partial enlarged view which shows enlarged a portion which is surrounded by a circle A of FIG. 2A. As shown in FIG. 2B, each projecting part 12a of the hub 12 is an approximately trapezoidal shape which has two slanted faces 12b and 12c. Further, each recessed part 13a of the brake pad 13 is an approximately trapezoidal shape which has two slanted faces 13b and 13c and which corresponds to a projecting part 12a of the hub 12.

As can be seen from FIG. 2B, each recessed part 13a of the brake pad 13 is larger than a projecting part 12a of the hub 12. The distance between the slanted faces 13b and 13c of the brake pad 13 is larger than the distance between the slanted faces 12b and 12c of the hub 12. In FIG. 2B, the hub 12 rotates counterclockwise, so first slanted faces 12b of the hub 12 and first slanted faces 13b of the brake pad 13 contact each other.

Figure 2C:
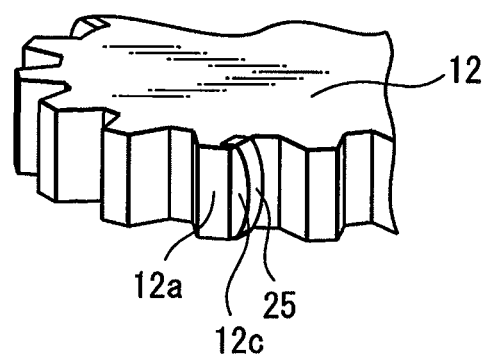
FIG. 2C is a partial perspective view of a hub.

Further, FIG. 2C is a partial perspective view of a hub. As shown in FIG. 2B and FIG. 2C, at another slanted face 12c of the hub 12, an elastic member constituted by a leaf spring 25 is arranged. As can be seen from FIG. 2C, the two end parts of the leaf spring 25 are attached to the opposite end faces of a projecting part 12a. Further, the majority of the leaf spring 25 is bent along the slanted face 12c. For this reason, in FIG. 2B, the attachment part 25a and the bent part 25b of the leaf spring 25 are shown visually differentiated.

Figure 3:
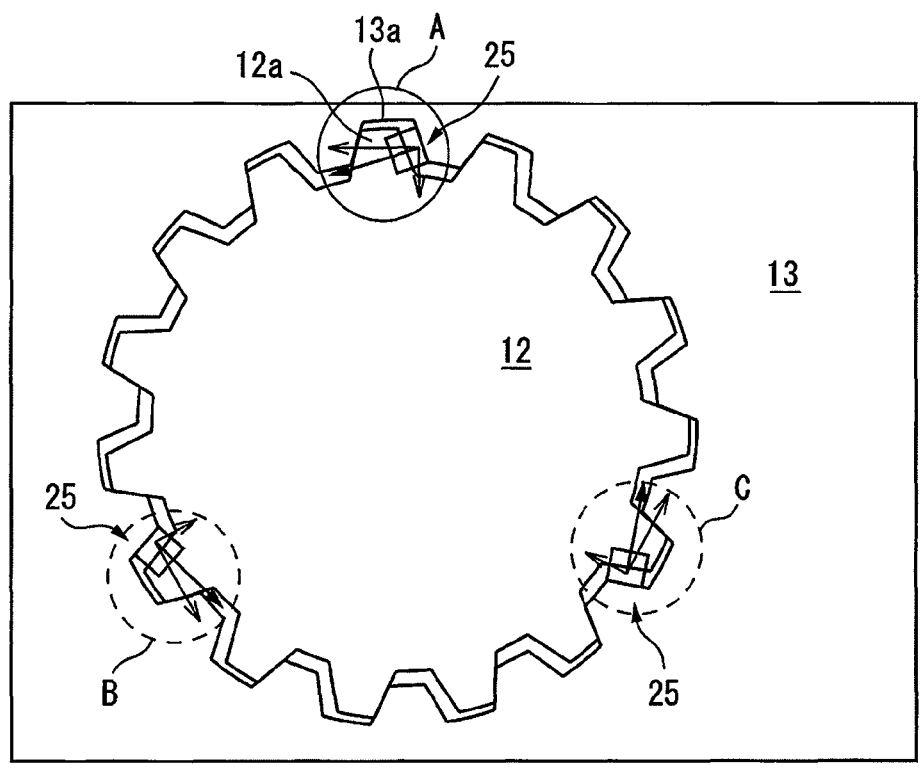
FIG. 3 is an enlarged view of a hub.

In this regard, FIG. 3 is an enlarged view of a hub. As shown in FIG. 3, a leaf spring 25 is arranged not only between the projecting part 12a and the recessed part 13a at the circle A, but also between the projecting parts and the recessed parts which are positioned in the two circles B and C which are shown by the broken lines in FIG. 3. As can be particularly seen from FIG. 3, the circles A, B, and C are arranged at positions forming a regular triangle. As a result, the three leaf springs 25 are arranged point symmetrically with respect to the shaft 11 (not shown in FIG. 3). In other words, the biasing directions of the three leaf springs 25 are generally equal to the rotational direction of the not shown shaft 11.

As can be seen from FIG. 3, the biasing forces of the three leaf springs 25 are divided into radial direction forces and circumferential direction forces. Further, these radial direction forces cancel each other out. For this reason, only the circumferential direction forces remain.

As can be seen with reference again to FIG. 2B, due to these circumferential direction forces, the bent parts 25b of the leaf springs 25 push against the second slanted faces 13c of recessed parts 13a of the brake pad 13. As a result, the first slanted faces 12b of the projecting parts 12a of the hub 12 push against the first slanted faces 13b of the recessed parts 13a. Therefore, in the present invention, no clearances (backlash) occurs between the first slanted faces 12b of the projecting parts 12a of the hub 12 and the first slanted faces 13b of the recessed parts 13a of the brake pad 13.

Furthermore, in the present invention, three leaf springs 25 are arranged point symmetrically with each other about the shaft 11. For this reason, even if these leaf springs 25 push the corresponding recessed parts, the pushing forces are balanced with each other and the hub 12 and brake pad 13 will never become offset from the shaft 11. Further, in the leaf springs 25, only the bent parts 25b contact the corresponding recessed parts, so movement of the brake pad 13 in the axial direction is not obstructed either.

Figure 4:
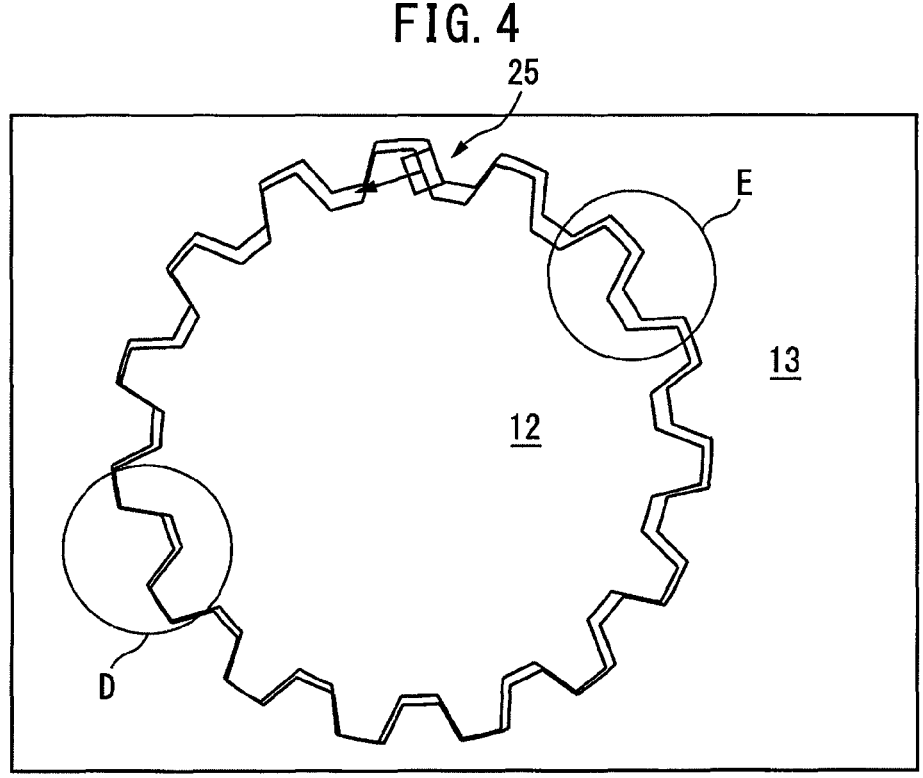
FIG. 4 is another enlarged view of a hub.

As opposed to this, in FIG. 4, which is another enlarged view of the hub, only one leaf spring 25 is attached to the hub 12. In other words, leaf springs 25 are not arranged point symmetrically about the shaft 11. For this reason, in the portion which is shown by the circle E in FIG. 4, a clearance is formed between a front end of a projecting part of the hub 12 and a bottom surface of a recessed part of the brake pad 13, while at the portion which is shown by the circle D, no clearance is formed between the front end of a projecting part of the hub 12 and a bottom surface of a recessed part of the brake pad 13. In other words, in FIG. 4, the hub 12 is offset from the shaft 11.

Figure 5A:
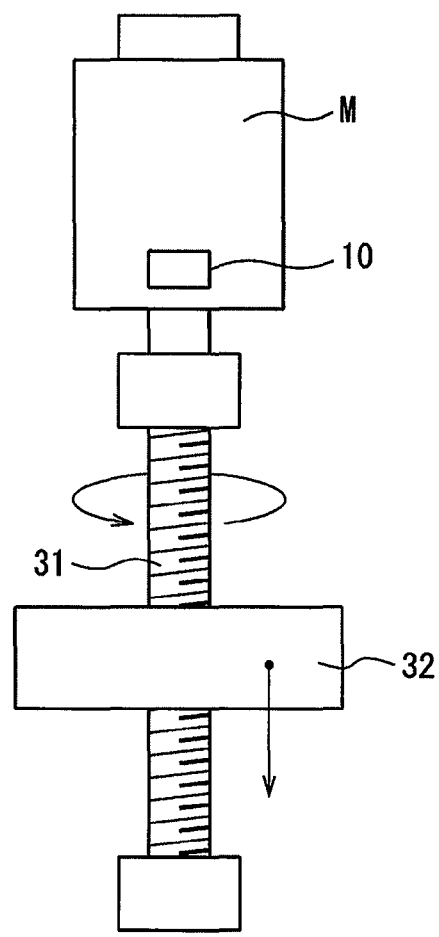
FIG. 5A is a view which shows an electric motor at which an electromagnetic brake of the present invention is built in and a ball screw device.
Figure 5B:
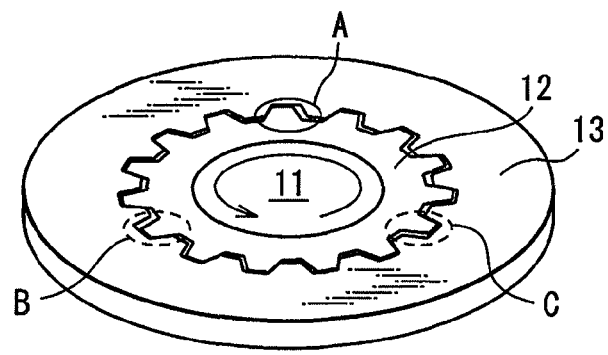
FIG. 5B is a perspective view of a hub and brake pad.

FIG. 5A is a view which shows an electric motor M at which an electromagnetic brake of the present invention is built in and a ball screw device. In FIG. 5A, the electric motor M is one which has a built-in electromagnetic brake 10. Furthermore, the output shaft of the electric motor M is coupled with a threaded shaft 31 of the ball screw device. In this case, the shaft 11 of the electromagnetic brake 10 and the threaded shaft 31 may be the same. The ball screw device is assumed to be one which forms part of a machine tool. Furthermore, FIG. 5B is a perspective view of a hub and brake pad. As shown in FIG. 5A and FIG. 5B, if using the shaft 11 to make the hub 12 rotate counterclockwise, a nut 32 of the ball screw device descends.

At the three circles A, B, and C which are shown in FIG. 5B, the above-mentioned leaf springs 25 are arranged. As stated above, due to these leaf springs 25, first slanted faces 12b of the projecting parts 12a of the hub 12 are pushed against first slanted faces 13b of the recessed parts 13a of the brake pad 13. Therefore, the direction in which the leaf springs 25 bias the hub 12 and the direction of rotation of the hub 12 making the nut 32 descend are equal. Due to such a configuration, even if the shaft is subjected to a load, the shaft 11 will not become offset and the threaded shaft 31 can be prevented from dropping slightly due to gravity.

Figure 6:
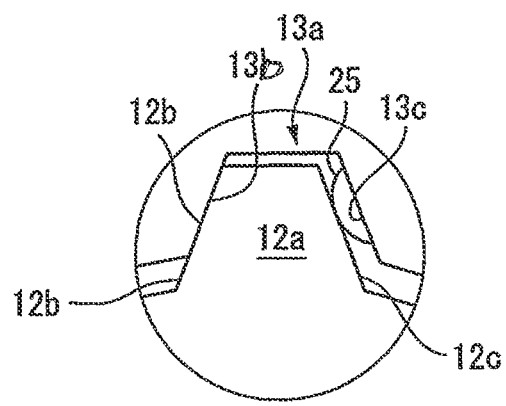
FIG. 6 is a partial enlarged view of a hub and brake pad in another electromagnetic brake.

In this regard, FIG. 6 is a partial enlarged view of a hub and brake pad in another electromagnetic brake. In FIG. 6, the leaf spring 25 is attached to the second slanted face 13c of the recessed part 13a of the brake pad 13 and are not attached to the projecting part 12a of the hub 12. As can be seen from FIG. 6, the two ends of the leaf spring 25 abut against steps which are formed at the slanted face 13c in the axial direction. In other words, the orientation of the leaf spring 25 which is shown in FIG. 6 is offset from the orientation of the leaf spring 25 which is shown in FIG. 2C by exactly 90°.

In such a case, the front end of the leaf spring 25 pushes against the second slanted face 12c of the projecting part 12a. Therefore, a clearance is prevented from occurring between the first slanted face 12b of the projecting part 12a and the first slanted face 13b of the recessed part 13a. For this reason, it will be understood that even in the other electromagnetic brake which is shown in FIG. 6, advantageous effects which are similar to those which are described above can be obtained.

Advantageous Effects of Invention

In the present invention, a plurality of elastic members are arranged between the engagement surface of the brake pad and the engagement surface of the hub symmetrically with respect to the center of rotation of the shaft so that the biasing directions are the same rotational direction. For this reason, it is possible to eliminate in advance any clearance between the engagement surface of the brake pad and the engagement surface of the hub. For this reason, even when the shaft is subjected to a load, the shaft will not become offset and the shaft can be prevented from dropping slightly at the time of brake operation.

Typical embodiments were used to explain the present invention, but a person skilled in the art would understand that the above-mentioned changes and various other changes, deletions, and additions may be made without departing from the scope of the present invention.

The invention claimed is:

1. An electromagnetic brake comprising a hub which is arranged fastened around a shaft the hub having a hub center of axis, a brake pad having a brake pad center of axis coinciding with the hub center of axis, the brake pad engages the hub and rotates together with the hub, a fixed end plate which is arranged at one side of the brake pad, an armature which is arranged at the other side of said brake pad, a biasing member which biases the armature to the end plate, and a field core which has an electromagnetic coil which magnetically attracts the armature against the biasing force of the biasing member, the hub is formed with a plurality of projecting parts and an inner circumferential surface of the brake pad is formed with a plurality of recessed parts, which engage the plurality of projecting parts the electromagnetic brake further comprising a plurality of elastic members which are arranged symmetrically with respect to the brake pad center of axis, the number of the plurality of elastic members is smaller than the number of the plurality of projecting parts and the number of the plurality of recessed parts and wherein each elastic member is located between an engagement surface of the brake pad and an engagement surface of the hub; and wherein said plurality of elastic members exert a balanced biasing force, because of their symmetrical arrangement, in a same rotational direction as the shaft when the shaft is rotating, so that any clearance between an engagement surface of the brake pad and an engagement surface of the hub is eliminated in advance and the hub and the brake pad never become offset from the shaft, wherein each of said plurality of elastic members is a leaf spring, wherein two end parts of the leaf spring are attached to opposite end faces of one projecting part of the hub, and wherein the leaf spring is bent along one slanted face of two slanted faces of the one projecting part.

2. An electric motor with an electromagnetic brake comprising the electromagnetic brake of claim 1.

3. A machine having a shaft on which an electromagnetic brake of claim 1 is arranged, the shaft is coupled a nut of the ball screw device so that the nut descends when the hub rotates in a counterclockwise direction.

4. The electromagnetic brake according to claim 1, wherein said plurality of elastic members comprises three.

\* \* \* \* \*